(12) United States Patent
Lysaght

(10) Patent No.: US 9,894,826 B2
(45) Date of Patent: Feb. 20, 2018

(54) PLANT MAINTENANCE APPARATUS WITH PLANT SENSING MEMBERS

(71) Applicant: Plant Detection Systems Limited, Napier (NZ)

(72) Inventor: Andrew John Lysaght, Napier (NZ)

(73) Assignee: Plant Detection Systems Limited, Napier (NZ)

( * ) Notice: Subject to any disclaimer, the term of this patent is extended or adjusted under 35 U.S.C. 154(b) by 28 days.

(21) Appl. No.: 14/905,015

(22) PCT Filed: Jul. 17, 2014

(86) PCT No.: PCT/NZ2014/000148
§ 371 (c)(1),
(2) Date: Jan. 14, 2016

(87) PCT Pub. No.: WO2015/009170
PCT Pub. Date: Jan. 22, 2015

(65) Prior Publication Data
US 2016/0157411 A1 Jun. 9, 2016

(30) Foreign Application Priority Data
Jul. 18, 2013 (NZ) ........................................ 613391

(51) Int. Cl.
*A01B 63/00* (2006.01)
*A01B 79/00* (2006.01)
(Continued)

(52) U.S. Cl.
CPC ............ *A01B 63/004* (2013.01); *A01B 39/14* (2013.01); *A01B 39/18* (2013.01); *A01B 39/26* (2013.01);
(Continued)

(58) Field of Classification Search
CPC ......... A01B 63/00; A01B 39/28; A01B 39/26; A01B 79/00; A01B 63/004
(Continued)

(56) References Cited

U.S. PATENT DOCUMENTS 3,955,626 A * 5/1976 Taylor .................... A01B 39/16
172/6
3,959,924 A 6/1976 Allen, Jr.
(Continued)

FOREIGN PATENT DOCUMENTS

GB 900280 A 7/1962

*Primary Examiner* — John Weiss
(74) *Attorney, Agent, or Firm* — Larson & Anderson, LLC

(57) ABSTRACT

The invention disclosed is a plant maintenance apparatus to move along a plant or line of plants. The apparatus has a support frame to connect to a prime mover to move the apparatus. A sensing member is mounted from the frame, to contact and be deflected by the plant as the apparatus is moved. A sensor to senses the deflection and if the deflection is above a threshold it issues a signal to an actuator. There is a near ground member, mounted from and moving with the frame. The near ground member acted on by the actuator, so that when the threshold is met the near ground member moves to a first position away from the plant when immediately adjacent thereto, and then moves to a second position once past said plant. The result is the near ground member can treat a ground or soil or otherwise at or near a plant at least when in the second position, including disturbing any non-desired plants on the ground, while moving away from and not disturbing the plant which is sensed and above the threshold when in the first position.

22 Claims, 4 Drawing Sheets

(51) Int. Cl.
    *A01B 39/26* (2006.01)
    *A01B 39/14* (2006.01)
    *A01B 39/18* (2006.01)
    *A01B 39/28* (2006.01)
    *A01B 39/04* (2006.01)

(52) U.S. Cl.
    CPC .............. *A01B 39/28* (2013.01); *A01B 79/00* (2013.01); *A01B 39/04* (2013.01)

(58) Field of Classification Search
    USPC .......................................................... 172/5, 6
    See application file for complete search history.

(56) References Cited

U.S. PATENT DOCUMENTS

| | | | | |
|---|---|---|---|---|
| 4,607,716 A * | 8/1986 | Beck | .................... | A01B 69/004 |
| | | | | 104/244.1 |
| 5,181,572 A * | 1/1993 | Andersen | ............. | A01B 69/004 |
| | | | | 172/5 |
| 5,511,623 A * | 4/1996 | Frasier | ................. | A01B 59/062 |
| | | | | 172/191 |
| 5,515,928 A * | 5/1996 | Niday | ................... | A01B 63/102 |
| | | | | 172/450 |
| 7,460,942 B2 * | 12/2008 | Mailer | ................. | A01B 69/004 |
| | | | | 342/357.76 |

* cited by examiner

PLANT MAINTENANCE APPARATUS WITH PLANT SENSING MEMBERS

TECHNICAL FIELD OF THE INVENTION

The present invention relates to maintain plants and their surrounding environment.

In particular, though not solely, the present invention is directed to systems and apparatus to maintain the soil and supporting structure around a plant, or plants, and aid in weed control.

BACKGROUND OF THE INVENTION

There is a need to control non-productive plant growth around productive plants. This is especially so when the productive plants are in an early stage and the non-productive plants may otherwise crowd or compete with the productive plant for space, sunlight, moisture and nutrients. Also reducing non-productive plant presence and growth increases the purity of harvested product as unwanted plant species and content is reduced or removed.

In addition it is desirable to keep soil about the plant in a particular state, for example around the base of the plant to protect and support it.

Traditionally the solution to these problems was to hand weed around the furrows and rows of the plants. This was accurate and being done by a human would allow for correct identification between producing and non-producing species. The human, even using a tool, was then skilled enough to extract or cover the non-producing species and leave the producing species undamaged. This would also move surrounding soil where it was needed.

However, human based solutions while accurate are time and labour intensive.

Weeding using tools is preferable and mandatory for some crops during or toward their final growth stage. Therefore weed-killer spraying, even spot or targeted spraying can be undesirable. Further such spraying does not condition and move the soil in the beneficial ways that weeding using tools can.

Automated solutions have also been developed—mainly these use spray or mechanical systems, which have the disadvantages already discussed.

Automated systems that use mechanical weeding are known. However these tend to use optical sensing and pattern recognition to activate the weeding system. Optical based systems, quite apart from the significant programming required and sensitive equipment present, also need a continuous quality power supply and are sensitive to fluctuations in that supply. Other systems utilise GPS technology. However, this requires not only a very accurate and sophisticated GPS system, but also the exact GPS location of each plant to then activate the weeding for each individual plant.

It would therefore be desirable to achieve a solution to these problems using a mechanised approach, which reduces the time and labour component but keeps the accuracy and does not damage the producing species nor the environment.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved plant maintenance system, method and apparatus, or to overcome the above shortcomings or address the above desiderata, or to at least provide the public with a useful choice.

BRIEF DESCRIPTION OF THE INVENTION

In a first aspect the present invention consists in a plant maintenance apparatus adapted to be moved in a direction of movement adjacent to or along a plant, said apparatus comprising or including,
  A support frame for connection to a prime mover to enable at least said movement,
  At least one sensing member, mounted from said frame, to contact and be deflected by said plant as said apparatus is moved,
  A first sensor to sense said deflection and if said deflection is above a threshold issue a signal to an actuator,
  At least one near ground member, mounted from said frame and moving therewith, said at least one near ground member acted on by said actuator, such that when said threshold is met said at least one near ground member moves to a first position away from said plant when immediately adjacent thereto, and then moves to a second position once past said plant,
  Such that said at least one near ground member can treat a ground or soil or otherwise at or near a plant at least when in said second position, including disturbing any non-desired plants on said ground, whilst moving away from and not disturbing said plant which is sensed and above said threshold when in said first position.

Preferably there is a pair of said at least one sensing members, adapted to locate either side of said plants, and drive said first sensor.

Preferably each said sensing member drives its own said first sensor.

Preferably said plant is part of a line or row of plants.

Preferably said line of plants is substantially aligned in a straight line.

Preferably said apparatus when being moved adjacent or along said plant has a line of said movement along a centre line of said plant.

Preferably there is a guide throat mounted from said support frame to guide said plant to said at least one sensing member.

Preferably said guide throat lifts any foliage of said plant clear of said ground.

Preferably said at least one sensing member is pivotally mounted from said support frame.

Preferably said deflection of one or both said pair of sensing members is detected and used to measure said threshold.

Preferably there is a pair of said near ground members.

Preferably said near ground members can be actuated independent of, or together with, each other.

Preferably each of said pair of near ground members is located one either side of said plants.

Preferably said near ground member is a ground engaging member to till said ground, and disturb any said non-desired plants.

Preferably said disturbing is by burying, removing from said ground, severing, or otherwise destroying said non-desired plant.

Preferably said near ground member moves at least some of said ground to around a base of said plant.

Preferably said near ground member(s) may otherwise apply a chemical, or perform an operation on said desired plant, for example trimming, debudding, pruning or similar.

Preferably a timing between sensing said threshold and actuation of said near ground member is adjustable.

Preferably said first sensor is electrical, for example proximity, Hall-effect, micro-switch, or other sensor.

Preferably said first sensor is mechanical.

Preferably said actuator is an air ram to move said near ground member to said first position, or to said second position, to work against a biasing return means to said second position or said first position.

Preferably there is a second sensor forward with respect to said direction of movement which senses a presence of a said plant and arms said first sensor and/or actuator, for example said second sensor could be infrared, laser or similar to detect presence of a plant.

Preferably said near ground member(s) is/are mounted on said support frame such that at least an acting or effective part thereof moves substantially perpendicular to said direction of movement.

Preferably said near ground member(s) are mounted pivotally or slidably on or from said support frame.

Preferably said acting or effective part moves in a substantially horizontal direction.

Preferably said ground engaging member(s) at least in part locate beneath a surface of said ground to till or hoe said soil.

Preferably there is a plurality of said apparatus connected to said prime mover to be moved along one or more lines of said plants at a time.

Preferably said apparatus includes adjustment of said support frame relative to said prime mover perpendicular to said direction of movement, to adjust for a desired height and or width relative said prime mover or ground.

Preferably said adjustment is a sliding tool bar for mounting and adjusting said apparatus or said plurality thereof.

Preferably said adjustment can be controlled manually or automatically.

Preferably said automatic adjustment is achieved through GPS or infrared cameras.

Preferably data from at least said first sensor(s) is recorded, with GPS co-ordinates and time to load into a database about said plant or plants.

Preferably there are additional static members to affect said plant(s) or ground as said apparatus is moved.

In another aspect the present invention consists in a method of maintaining plants comprising or including the steps of, Moving a support frame connected to a prime mover along a line of plants, Sensing at least one of said plants by at least one sensing member contacting and being deflected by at least one of said plants, said at least one sensing member being mounted from said frame, Signalling an actuator to actuate at least one near ground member if said deflection is above a threshold, Wherein said at least one near ground member, mounted from said frame and moving therewith, is moved when said threshold is met to a first position away from said plant when immediately adjacent thereto, and then moves to a second position back again once past said plant, Such that said at least one near ground member can treat a ground or soil at or near a plant, including disturbing any non-desired plants on said ground, whilst moving away from and not disturbing said plant which is sensed and above said threshold.

Preferably there is a pair of said at least one sensing member, adapted to locate either side of said plants.

Preferably said plant is part of a line or row of plants.

Preferably said line of plants are substantially aligned in a straight line.

Preferably said movement adjacent or along said line of plants has a line of said movement along a centre line of said plants.

Preferably including providing a guide throat mounted from said support frame to guide said plant to said at least one sensing member.

Preferably said guide throat lifts any foliage of said plant clear of said ground.

Preferably said at least one sensing member is pivotally mounted from said support frame.

Preferably said deflection of both said pair of sensing members is detected and used to measure said threshold.

Preferably said near ground members are ground engaging members to till said ground, and disturb any said non-desired plants.

Preferably said disturbing is by burying, removing from said ground, severing, or otherwise destroying said non-desired plant.

Preferably said near ground members move at least some of said ground to around a base of said plant.

Preferably there is a timing between sensing said threshold and actuation of said near ground member is adjustable.

Preferably said first sensor is electrical, for example proximity, Hall-effect, micro-switch, or other sensor.

Preferably said first sensor is mechanical.

Preferably said actuator is an air ram to move said near ground members to said first position, or to said second position, to work against a biasing return means to said second position or said first position.

Preferably there is a second sensor forward with respect to said direction of movement which senses a presence of a said plant and arms said first sensor and/or actuator.

Preferably said near ground members are mounted on said support frame such that at least an acting or effective part thereof moves substantially perpendicular to said direction of movement.

Preferably said near ground members are mounted pivotally or slidably on or from said support frame.

Preferably said acting or effective part moves in a substantially horizontal direction.

Preferably said ground engaging members at least in part locate beneath a surface of said ground to till or hoe said soil.

Preferably there is a plurality of said steps are performed behind said prime mover to be moved along two or more lines of said plants at a time.

Preferably said method includes adjustment of said support frame relative to said prime mover perpendicular to said direction of movement, to adjust for a desired height and or width relative said prime mover or ground.

Preferably said adjustment is a sliding tool bar for mounting and adjusting said apparatus or said plurality thereof.

Preferably said adjustment can be controlled manually or automatically.

Preferably said automatic adjustment is achieved through GPS or infrared cameras.

In a further aspect the present invention consists in a plant maintenance apparatus as described herein with reference to any one or more of the accompanying drawings.

In still a further aspect the present invention consists in a method of maintaining plants as described herein with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which.

DETAILED DESCRIPTION OF THE INVENTION

Preferred embodiments will now be described with reference to FIGS. 1 through 4.

Figure 1:
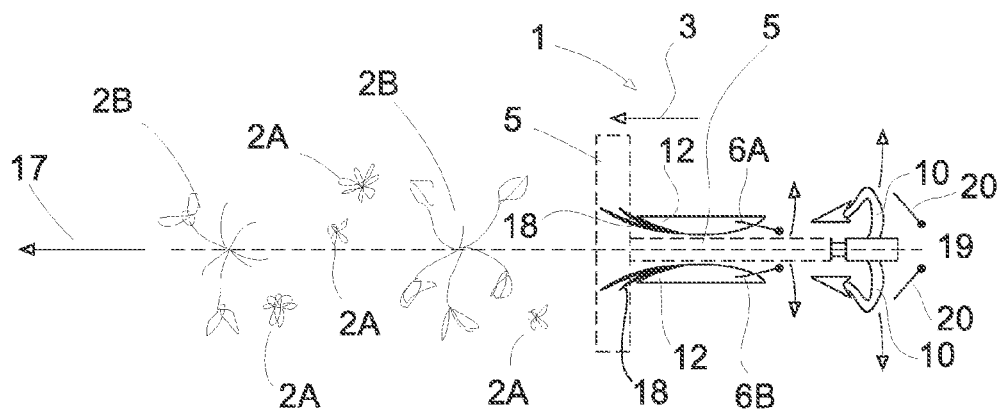
FIG. 1 Shows a linear line of plants and the direction of movement of the apparatus of the present invention along them from above, using a prime mover (not shown), FIG. 2 Shows the same view as that in FIG. 1 but from the side, FIG. 3 Shows one embodiment of the actuated and non-actuated near ground members, in that case as ground engaging members to till the soil and weed, FIG. 4 Is a flow diagram of a method of control of the present invention, and FIG. 5 Shows a number of units from behind when drawn by a prime mover along several lines of plants.
Figure 2:
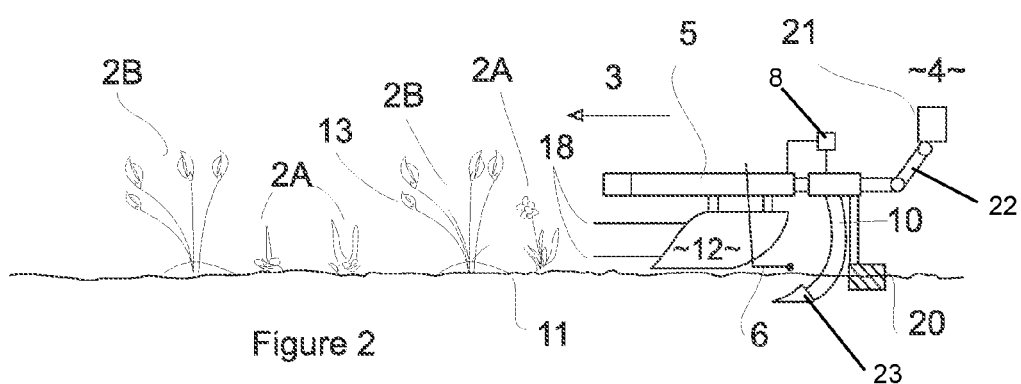

In FIGS. 1 and 2 a line 17 of desired plants 2B is shown. The line 17 shown here is a straight one as is common in agriculture, for example in a ploughed and planted field. However, equally the line 17 could be curved in any way as long as this line 17 can be followed. Among the desired plants 2B are non-desired plants 2A. These are typically weeds, or any plant (even a productive one) that is not needed or desired.

The apparatus 1 for plant maintenance is also shown in FIGS. 1 and 2. The apparatus 1 is drawn in a direction of movement 3 by a prime mover 4 (not shown) to substantially follow the line 17 of plants 2B. In the preferred form the apparatus 1 is drawn behind a prime mover, for example a tractor or similar, and is mounted to the draw bar thereof. However the apparatus could also be forward or mid-mounted on the prime mover, of any combination thereof.

The apparatus 1 has a support frame 5 from which the majority of following components are mounted. Forward most are initial guides 18 which direct plants toward the centre line 19 of the apparatus 1, or alternatively direct the centre line 19 of the apparatus to or towards the line 17 of the plants.

Also mounted from the support frame 5 is a guide throat 12. The guide throat 12 and initial guides 18 are preferably slung underneath the support frame 5 at a height starting just below the foliage 13 of the plants 2B. This height can be adjusted as desired for different age or different plants. The throat 12 closes over its length such that foliage moving along it as the apparatus is drawn along the line of movement 3, is carried upwards and away from the ground 11. This keeps the base of the plant 2B clear for actions which are described below.

In addition the support frame itself may be adjusted relative to the ground level, for the desired depth or effect, and may also be adjust horizontally as needed to adjust to the line of plants. The horizontal adjustment may be achieved via a sliding bar 21 between the prime mover and the support frame allowing movement horizontally of the apparatus relative the prime mover 4 and/or the ground 11. Adjustment relative the ground level may be achieved by raising or lowering the slide bar for example, this may be achieved by raising or lowering the draw bar or similar of the prime mover. The adjustments may be driven hydraulically. The adjustment both horizontally and vertically relative the ground may be achieved manually or automatically, for example, but not limited to, GPS or infrared camera input.

In addition the apparatus may have a floating articulated link 22 shown in FIG. 2 between the support frame and the prime mover, whether or not a sliding bar 21 exists between them. The floating link in one preferred form consists of a linkage with pivots at either end, one end connected to the support frame, the other end connected to the prime mover (directly or indirectly). The pivots articulate about an axis substantially parallel to the ground and perpendicular to the line of movement. In this way the apparatus is free to the extent the link 22 allows to move up and down and follow the terrain of the ground and any bumps therein.

For example when the near ground members 10 engage the ground as ground engaging members, then the apparatus is in part pulled downward into the ground, the floating link 22 allows the apparatus to move as needed up and down to follow the terrain of the ground 11 and any variations therein or thereon.

At a desired point along the length of the guide throat 12 and too one side is at least one sensing member 6A or 6B—in the preferred form there are two such sensors 6A and 6B on one each side of the guide throat 12—in one form of the invention they are pivotally mounted from the support frame 5 such that they can pivot outwardly of the centre line 19. As the plant 2 moves past them the sensor members 6 deflect outwardly—normally by the base area of the plant 2. The base area being exposed because the foliage has been lifted as earlier described. The sensing member(s) 6A and/or 6B may at any path along the apparatus, for example at the front or midway apparatus, or as shown toward the exit of the guide throat.

The deflection is sensed by a first sensor 8. A user adjustable threshold is set into the system, prior to, or during use. The threshold for example may be the size of the base area of plants 2 that are considered desirable, anything under that threshold size is considered undesirable (e.g. a weed) and is to be removed. There may also be an additional oversize threshold so that plants over a certain size are also removed. In this way undesirable plants that grow faster or slower than that target plant are removed or disturbed. In other options this may in addition or in place be a height sensor, and may be achieved in known sensing ways, such as by ultra-sound, sonar, or density detection.

Figure 3:
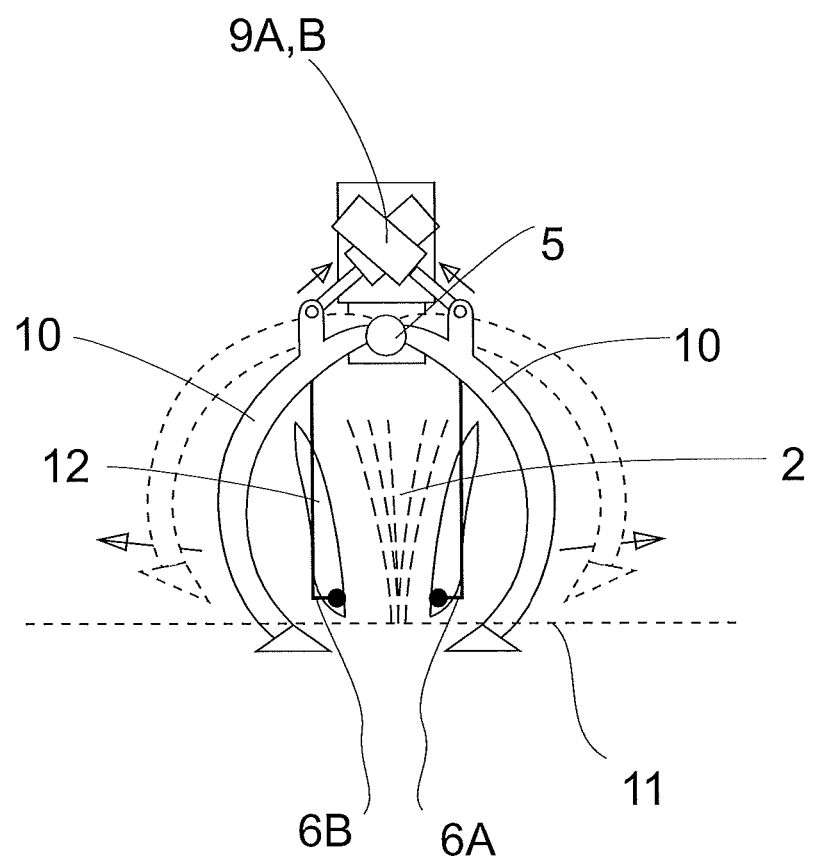
Figure 4:
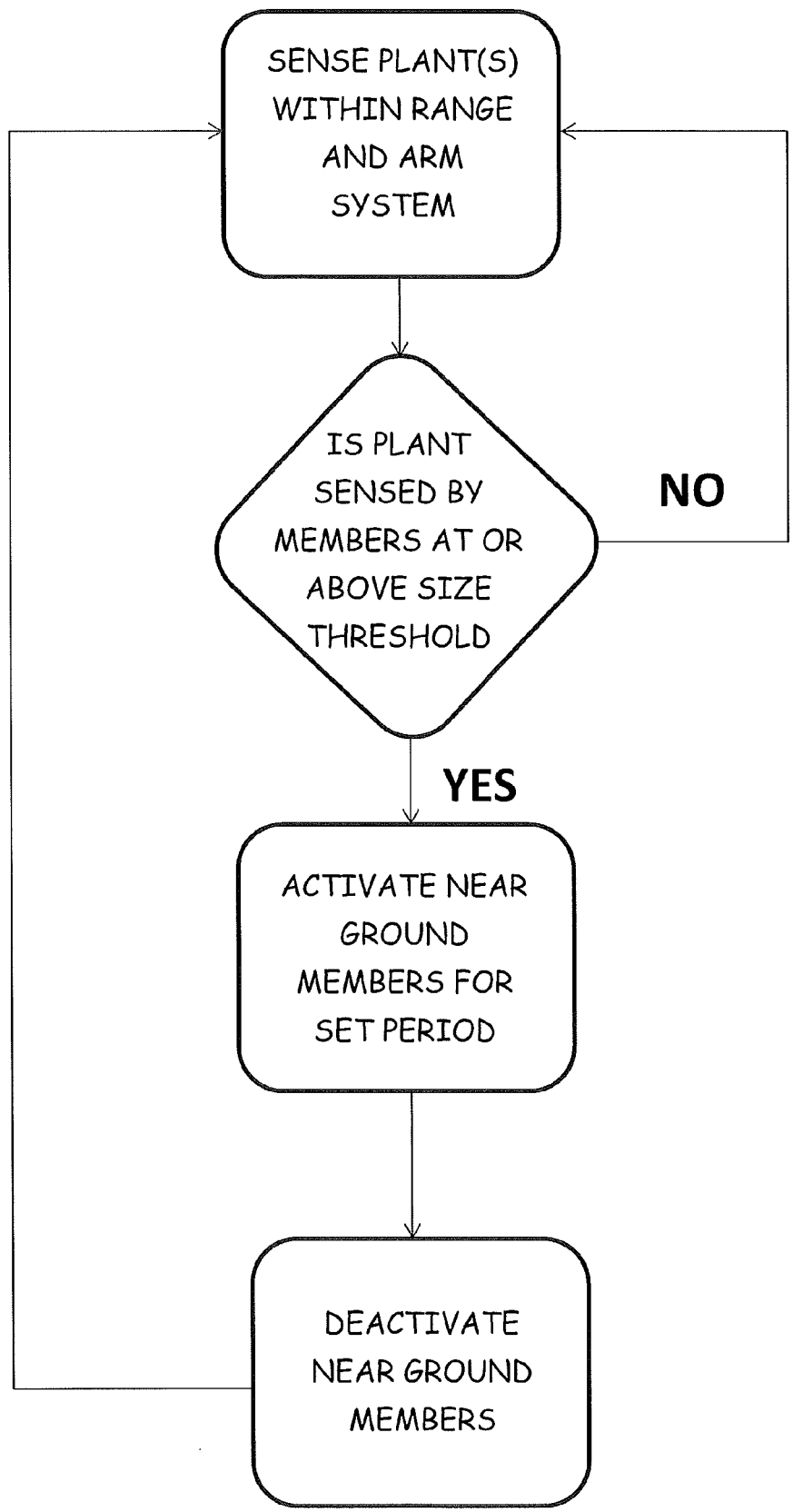
Figure 5:
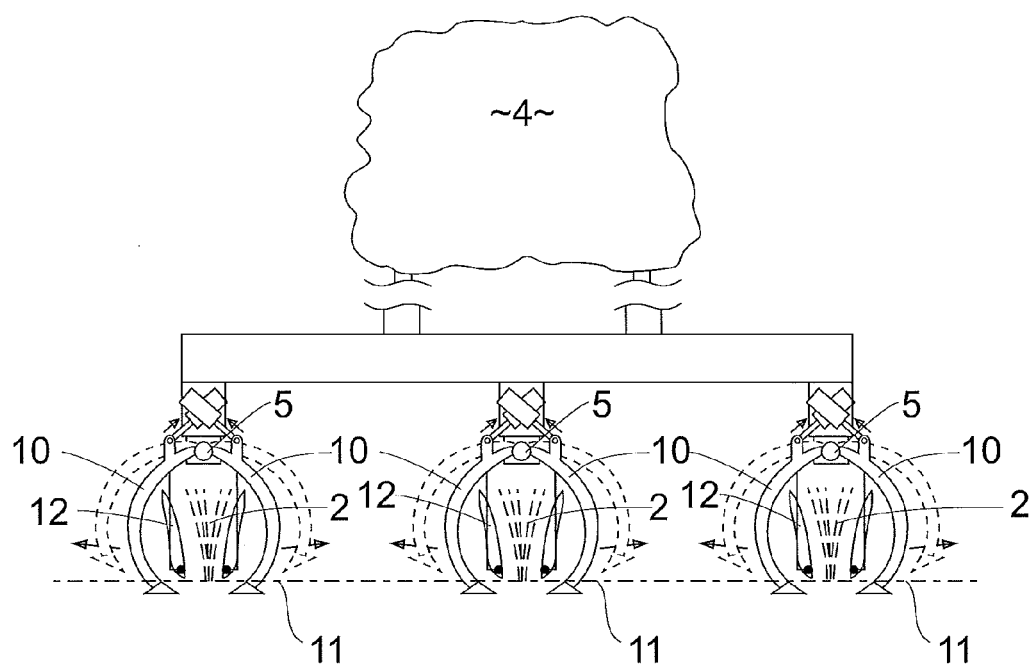

If this deflection exceeds a set user adjustable threshold, and optionally is under the oversize threshold, then a signal is sent to an actuator 9A and/or 9B. The actuator engages and can move a near ground member 10 as desired. In one embodiment there are two such members 10, and they engage just below the ground, as ground engaging members, for example as hoes or cultivators. The actuator moves this preferably pair of members 10 as shown in FIGS. 1 through 3. Namely when un-actuated they lie a certain distance off the line 17—held in place by a biasing means (not shown). When actuated they move outwardly via the actuator 9 (for example an air ram, motor or similar). A timer (mechanical or otherwise) sets the time between sensing by the sensor 8 and actuation and also de-actuation and closing. A biasing means, for example a spring may help, or may be solely responsible for closing, for example a spring. Alternatively the spring may hold the members open and the actuator may close them. In other embodiments the actuator may both open and close the members. In other embodiments the near ground member 10, for example the ground engaging member may be actuated by its own actuator 9, for example where there is a pair of members 10 as shown in FIG. 3, each with its own independent actuator 9A, B. In this configuration the members 10 may be actuated together at the same time, or where there are multiple sensors, for example one for each sensing member 6, then a decision can be made with straightforward logic to operate both, or one member 10 independently. For example if one sensing member 6A is deflected, but not the other 6*b*, then the member 10 corresponding to that side only may be operated.

In the preferred form as described the members 10 then till the ground about the plants 2 as the apparatus is moved. This severs or disrupts any non-desired plants 2A, and when a desired plant 2B is sensed, they move outwardly to avoid the plant 2B. This also moves soil about aerating it and forms mounds 15 about the base of the plant 2B.

In addition to this there may be further members, static or otherwise that help move the soil and direct it as needed. For example a pair of guide paddles 20 or hilling units at the rear as shown in FIGS. 1 and 2 downstream of the near ground members may help further direct the soil, for example to further mound it up by the plants. In other embodiments there are other fixed components or static members also, such as leading hoes 23 as shown. These can be interchanged with other plant, ground or soil engaging equipment such as, needed, for example spring torsion rods, which under their own tension move around the desired plant, whilst helping to bring cut off weeds to the surface, these tension rods would be in a horizontal position in place of the hillers 20, and would be ground engaging below the surface. Hoes such as this have the advantage of maintaining an even or consistent depth of the machine and its ground engaging parts. The hoes also have the advantage of keeping the area before the active ground engaging members level and so aid the effectiveness of these.

In other forms the members 10 may have other additional or other functionality, for example they may contain a spray for applying fertiliser or similar to or near the plant, for vine, tree, or stem growth vigour control, or debudding or pruning grape vines or similar. For those plants that are allowed some herbicide then there may be spot application of a small accurate amount. In still other forms the functionality may perform further actions on the plant such as trimming or other plant treatment necessary. In other forms of the invention data may be stored of the exact location of each desired plant 2A and its size at a point in time. For example the sensed deflection may in addition be stored with the GPS co-ordinates and time of that sensed deflection. This can be used to build a data base of the plants and the establishment of the crop. This database can then be used for many purposes, including, but not limited to, precision application of fertiliser (eg for underperforming plants), or trimming of oversized plants, or help direct future cultivation and harvesting. Such database could be stored locally or to the cloud.

It is possible the sensing system alone (sensing member(s) 6, and sensors and controlling system) could be used to simply count nursery stock with no engagement of the ground or similar.

Optionally also there may be a second sensing means, which senses generally the presence of a plant (desired or otherwise) and arms the system. The first sensor may be electrical, for example a proximity, Hall-effect or sensor or micro-switch, or may be mechanical and uses a lever system to open and close the members 10.

The prime mover 4 could be a tractor or similar propulsion, but also may be hand or animal drawn, and uses a power take off to power on-board systems, or may use solar power to power on-board systems. In other embodiments the apparatus may generate power for sensing and actuation through its movement, for example by use of a ground engaging follower wheel to generate mechanical or electrical energy.

The apparatus may also have a cover to protect the inner workings as well as protect users from injuring themselves, or tangling or otherwise.

There may also be a plurality of units drawn behind the prime mover to effect two or more rows of plants.

The foregoing description of the invention includes preferred forms thereof. Modifications may be made thereto without departing from the scope of the invention.

The invention claimed is:

1. A plant maintenance apparatus adapted to be moved in a direction of movement adjacent to or along a plant, said apparatus comprising or including,
   - a support frame for connection to a prime mover to enable at least said movement,
   - at least one pair of sensing members to locate either side of said plant, mounted from said frame, to contact and be deflected by said plant as said apparatus is moved,
   - a first sensor to sense said deflection and if said deflection is above a threshold issue a signal to an actuator,
   - at least one near ground member, mounted from said frame and moving therewith, said at least one near ground member acted on by said actuator, such that when said threshold is met said at least one near ground member moves to a first position away from said plant when immediately adjacent thereto, and then moves to a second position once past said plant,
   - such that said at least one near ground member can treat a ground or soil or otherwise at or near a plant at least when in said second position, including disturbing any non-desired plants on said ground, whilst moving away from and not disturbing said plant which is sensed and above said threshold when in said first position.

2. The apparatus as claimed in claim 1 wherein each said sensing member each drives a said first sensor.

3. The apparatus as claimed in claim 1 wherein said plant is part of a line or row of plants.

4. The apparatus as claimed in claim 1 wherein said apparatus when being moved adjacent or along said plant has a line of said movement along a centre line of said plant.

5. The apparatus as claimed in claim 1 wherein there is a guide throat mounted from said support frame to guide said plant to said at least one sensing member, and wherein said guide throat lifts any foliage of said plant clear of said ground.

6. The apparatus as claimed in claim 1 wherein said deflection of one or both said pair of sensing members is detected and used to measure said threshold.

7. The apparatus as claimed in claim 1 wherein there is a pair of said near ground members, wherein each of said pair of said near ground members is located on either side of said plants.

8. The apparatus as claimed in claim 1 wherein said at least one near ground member is a ground engaging member to till said ground, and disturb any said non-desired plants by burying, removing from said ground, severing, or otherwise destroying said non-desired plant.

9. The apparatus as claimed in claim 1 wherein said at least one near ground member moves at least some of said ground to around a base of said plant.

10. The apparatus as claimed in claim 1 wherein said at least one near ground member(s) applies a chemical, or performs an operation on said desired plant.

11. The apparatus as claimed in claim 1 wherein a timing between sensing said threshold and actuation of said near ground member is adjustable.

12. The apparatus as claimed in claim 1 wherein said first sensor is electrical or is mechanical.

13. The apparatus as claimed in claim 1 wherein there is a second sensor forward with respect to said direction of movement which senses a presence of a said plant and arms said first sensor and/or actuator.

14. The apparatus as claimed in claim 1 wherein said at least one near ground member(s) is/are mounted on said support frame such that at least an acting or effective part thereof moves substantially perpendicular to said direction of movement.

15. The apparatus as claimed in claim 1 wherein there is a plurality of said apparatus connected to said prime mover to be moved along one or more lines of said plants at a time, wherein said apparatus includes adjustment of said support frame relative to said prime mover perpendicular to said direction of movement to adjust for a desired height and/or width relative said prime mover or ground, wherein said adjustment can be controlled manually or automatically, wherein said automatic adjustment is achieved through GPS or infrared cameras, and where data from at least said first sensor(s) is recorded, with GPS co-ordinates and time to load into a database about said plant or plants.

16. A method of maintaining plants comprising or including the steps of,
moving a support frame connected to a prime mover along a line of plants,
sensing at least one of said plants by at least one pair of sensing members, to locate either side of said plants, contacting and being deflected by at least one of said plants, said sensing members being mounted from said frame,
signalling an actuator to actuate at least one near ground member if said deflection is above a threshold,
wherein said at least one near ground member, mounted from said frame and moving therewith, is moved when said threshold is met to a first position away from said plant when immediately adjacent thereto, and then moves to a second position back again once past said plant,
such that said at least one near ground member can treat a ground or soil at or near a plant, including disturbing any non-desired plants on said ground, whilst moving away from and not disturbing said plant which is sensed and above said threshold.

17. The method as claimed in claim 16 including providing a guide throat mounted from said support frame to guide said plant to said at least one sensing member wherein said guide throat lifts any foliage of said plant clear of said ground.

18. The method as claimed in claim 16 wherein said deflection of a pair of said sensing members is detected and used to measure said threshold.

19. The method as claimed in claim 16 wherein said at least one near ground members are ground engaging members to till said ground, and disturb any said non-desired plants, by burying, removing from said ground, severing, or otherwise destroying said non-desired plant.

20. The method as claimed in claim 16 wherein a timing between sensing said threshold and actuation of said near ground member is adjustable.

21. The method as claimed in claim 16 wherein there is a second sensor forward with respect to said direction of movement which senses a presence of a said plant and arms said first sensor and/or actuator.

22. The method as claimed in claim 16 wherein said method includes adjustment of said support frame relative to said prime mover perpendicular to said direction of movement, to adjust for a desired height and or width relative said prime mover or ground, wherein said adjustment is a sliding tool bar for mounting and adjusting said support frame or said plurality thereof, wherein said adjustment can be controlled manually or automatically, wherein said automatic adjustment is achieved through GPS or infrared cameras, and where data from at least said first sensor(s) is recorded, with GPS co-ordinates and time to load into a database about said plant or plants.

* * * * *